E. R. SCHREITER, Jr.
PADLOCK.
APPLICATION FILED APR. 27, 1918.
1,289,279.
Patented Dec. 31, 1918.
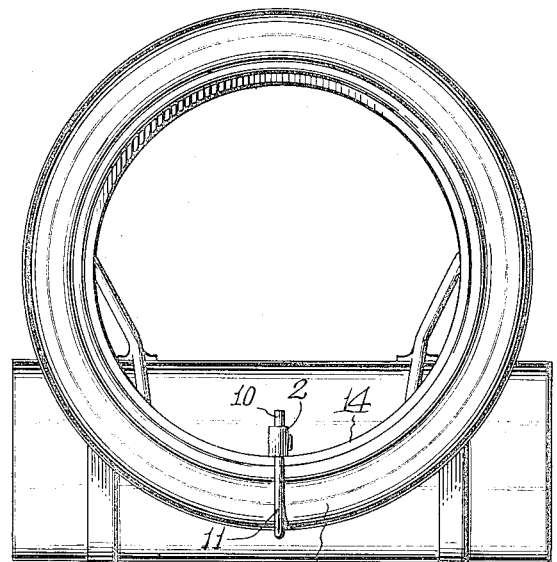
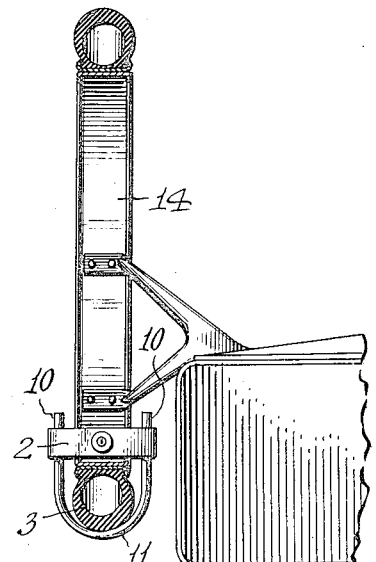
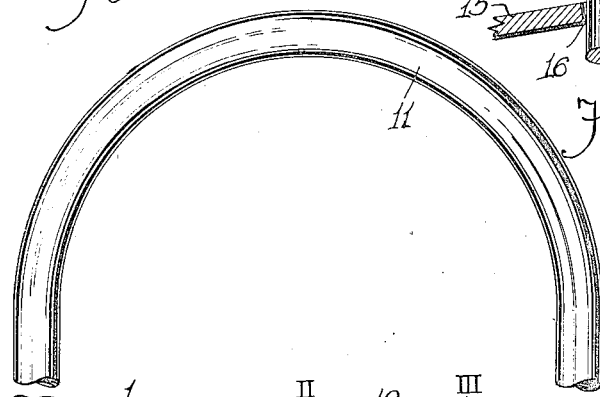
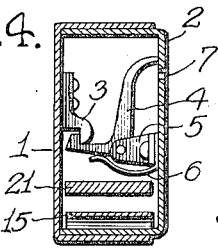
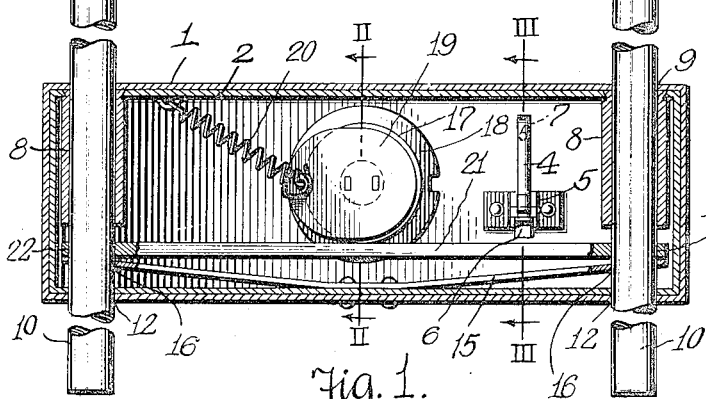
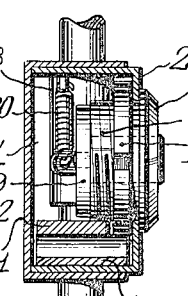
Witness
Chas. W. Stauffiger
Karl H. Butler
Inventor
Edward R. Schreiter Jr.
By
Barthel & Barthel
Attorneys

UNITED STATES PATENT OFFICE.

EDWARD R. SCHREITER, JR., OF DETROIT, MICHIGAN.

PADLOCK.

1,289,279.　　　　Specification of Letters Patent.　　Patented Dec. 31, 1918.

Application filed April 27, 1918. Serial No. 231,092.

*To all whom it may concern:*

Be it known that I, EDWARD R. SCHREITER, Jr., a citizen of the United States of America, residing at Detroit, in the county of Wayne and State of Michigan, have invented certain new and useful Improvements in Padlocks, of which the following is a specification, reference being had therein to the accompanying drawings.

This invention relates to a padlock, and the primary object of my invention is to provide positive and reliable means, in a manner as hereinafter set forth, for securing a tire on a spare tire carrier or other support, so that the same cannot be stolen or surreptitiously removed.

Another object of my invention is to provide a lock embodying a shackle, a sectional lock casing adapted to receive the shackle, and means within the sectional casing adapted for retaining the shackle in engagement therewith, so that any tires or endless members placed in the shackle against the lock casing cannot be removed therefrom.

A further object of my invention is to provide a lock of the above type wherein the parts are constructed with a view of reducing the cost of manufacture and at the same time retain those features by which durability and ease of assembling are secured. With such ends in view, my invention resides in the novel construction to be hereinafter described and then claimed.

Reference will now be had to the drawing, wherein—

Figure 1 is an enlarged elevation of a tire lock, showing the shackle partly broken away, and the sectional lock casing in longitudinal section, with the mechanism within the lock casing holding the shackle against removal;

Fig. 2 is a cross sectional view of the lock casing taken on the line II—II of Fig. 1;

Fig. 3 is a similar view taken on the line III—III of Fig. 1;

Fig. 4 is a detail sectional view of locking and release members relative to the ends of a shackle;

Fig. 5 is an elevation of a spare tire carrier and tire provided with a lock in accordance with my invention, and Fig. 6 is a vertical sectional view of the tire carrier and tire, showing the lock in connection therewith.

The lock comprises a casing composed of two telescopic sections 1 and 2 adapted to provide an oblong inclosure, the section 1 fitting over the section 2 and automatically snapping into engagement therewith. This is accomplished by providing the inner wall of the section 1 with a keeper 3, adapted to be normally engaged by a bell crank shaped latch 4 pivotally connected to a bracket 5 carried by the section 2 of the lock casing. The latch 4 is normally engaged by a compression spring 6 which maintains said latch in engagement with the keeper 3, but one end of said latch extends in proximity to a small opening 7 in the section 2 of the lock casing, so that a pin or other device (not shown) may be inserted in the opening 7 to release the latch 4 relative to the keeper 3 and thereby permit of the sections of the lock casing being separated when it is desired to inspect the interior of said casing.

The upper wall of the lock casing section 2, adjacent the ends thereof, has depending tubular guides 8 adapted to aline or register with openings 9 in the top wall of the casing section 1, so that the ends 10 of a shackle or tire retaining member 11 may be inserted in the lock casing. As shown, the bottom wall of the lock casing sections 1 and 2 have openings 12 adapted to aline or register so that the ends of the shackle or tire retaining member 11 may extend from the lock casing, thus permitting of the shackle being adjusted relative to a tire 13 and a spare tire carrier or support 14, until the shackle 11 embraces the tire 13 and positively holds the same in engagement with the carrier or support 14.

To hold the ends 10 of the shackle 11 in an adjusted position within the lock casing, the bottom wall of the casing section 2 has a resilient locking member 15 serving both ends of the shackle 11, said member being in the form of a flat spring connected to the casing section 2 intermediate the ends thereof, and with the ends of said locking member apertured, as at 16, so as to either freely receive the ends 10 of the shackle 11 or bind against said ends and prevent the removal of said shackle from the lock casing.

The casing section 2, which may be considered as forming the front wall of the lock casing, is provided with a conventional form of key operated lock 16 and said lock may be secured in position by having the barrel 17 of said lock screwthreaded and provided with a locking nut 18, said nut preventing removal of the lock 16, unless the sections 1 and 2 of the lock casing are separated. The inner end of the lock 16 has an oscillatory cam member 19 normally held stationary or in a retracted position by a coiled retractile spring 20 connecting the cam member 19 and the top wall of the casing section 2. Below the cam member 19 is releasing member 21 that is in the form of a bar serving both ends of the locking member 15. The ends of the releasing member 21 are apertured, as at 22, so as to provide clearance for the ends 10 of the shackle 11, and when said releasing member is actuated by the cam member 19 of the lock 16, the ends of the locking member 15 are depressed so that the openings 16 and the apertures 22 will perfectly aline and permit of the ends 10 of the shackle 11 being removed from the lock casing.

Before the shackle can be removed from the lock casing or placed in engagement therewith, it is necessary that the cam member 19 be swung to depress or release the member 21 and said member in turn depress the locking member 15, thus alining the openings and apertures in the ends of said releasing and locking members, so that the ends of the shackle may be inserted in or through the lock casing. The casing has been made in two sections so that the locking mechanism therein may be easily assembled, and to separate the casing sections it is necessary that the shackles be removed, therefore nothing can be gained by tampering with the lock casing with a view to releasing the shackle 11.

It is thought that the operation and utility of the lock will be apparent without further description, and while in the drawing there is illustrated a preferred embodiment of my invention, it is to be understood that the structural elements are susceptible to such variations and modifications as fall within the scope of the appended claims.

What I claim is:—

1. A pad-lock comprising a lock casing, a shackle having the ends adapted to be inserted in said lock casing, a single locking member in said casing adapted to have its ends receive and hold the ends of said shackle, a single releasing member in said lock casing adapted to have its ends engage said locking member and release said locking member relative to the ends of said shackle, and a lock carried by said casing adapted to shift said releasing member so as to actuate said locking member and release said shackle.

2. A pad-lock comprising a casing, a shackle adapted to have the ends thereof extend through said casing, a locking member mounted in said casing and having the ends thereof apertured to receive and frictionally engage said shackle, a releasing member normally in engagement with said locking member and having the ends thereof apertured to receive the ends of said shackle and adapted for depressing the ends of said locking member, and a lock carried by said casing adapted to actuate said releasing member so that said shackle may be moved out of engagement with said lock casing.

3. A pad-lock comprising a sectional lock casing, means in said casing adapted to retain the sections thereof together, a shackle adapted to have the ends thereof extend into said lock casing, and means in said lock casing adapted to frictionally engage the ends of said shackle to retain said shackle in engagement therewith.

4. A pad-lock comprising a sectional casing, means within said casing adapted to retain the sections thereof together, a shackle adapted to have the ends thereof extend through said lock casing, a locking member in said casing adapted to have the ends thereof frictionally engage the ends of said shackle, and means within said lock casing adapted to actuate said locking member to release said shackle.

5. A pad-lock comprising a casing composed of separable sections, a keeper carried by one of the casing sections, a spring pressed latch carried by the other casing section and adapted to engage said keeper and retain said casing sections together, a shackle adapted to have the ends thereof extend through the casing sections, means in said casing adapted for gripping the ends of said shackle, and means carried by one section adapted to release the gripping means in said casing.

In testimony whereof I affix my signature in the presence of two witnesses.

EDWARD R. SCHREITER, Jr.

Witnesses:
ANNA M. DORR,
CHAS. W. STAUFFIGER.